Jan. 17, 1950 — R. F. WHITELEGG — 2,494,848
METHOD OF LAMINATING FLOCK COATED VINYL
RESIN SHEET AND RESULTING PRODUCT
Filed June 21, 1946

Inventor
Rudolph F Whitelegg
By his Attorney

UNITED STATES PATENT OFFICE 2,494,848

METHOD OF LAMINATING FLOCK COATED VINYL RESIN SHEET AND RESULTING PRODUCT

Rudolph F. Whitelegg, New York, N. Y., assignor to B. B. Chemical Co., Boston, Mass., a corporation of Massachusetts Application June 21, 1946, Serial No. 678,517

6 Claims. (Cl. 154—123)

This invention relates to securing vinyl resin bodies to surfaces of base materials which may or may not be of vinyl resin and particularly to providing a finish or surfacing sheet of vinyl resin on a non-vinyl resin base.

Vinyl resin material, for example, the material known as "Vinylite" (a copolymer of vinyl chloride and vinyl acetate), is particularly desirable as a surface material because of its luster and fine appearance. Also, it is flexible, elastic, and resistant to abrasion and scratching. The material is waterproof and is easily cleaned.

Notwithstanding the desirability of providing vinyl resin surfaces on base materials, numerous applications of vinyl resin sheets have been found impracticable because of the difficulty encountered in securing the vinyl resin sheets in position. Because of the tendency of the vinyl resin sheet to tear, sewing or nailing vinyl resin sheet is often not a satisfactory method of securing the sheet in place. Adhesive securing of vinyl resin sheet has been satisfactory in some applications, but, because it ordinarily requires maintaining pressure over the entire adhered surface for an appreciable period, the method is unsatisfactory for general application. Also, no acceptable method has been devised for adhering vinyl sheet resin to surfaces including sharp angles or corners.

It is an object of the present invention to provide an improved method of securing vinyl resin material to a surface.

It is an additional object to provide an improved composite article having a vinyl resin material strongly adhered to a surface.

It is another object to provide a composite article comprising a base surface and a vinyl resin sheet as a finish layer thereover.

It is a still further object to provide a composite article having a vinyl resin sheet material adhered thereto in a manner providing improved appearance.

I have made the important discovery that vinyl resin material may be secured to objects of varied characters and shapes by first cementing flock of a particular fiber character to the vinyl resin by an adhesive capable of adhering to the vinyl resin, and then securing the fibered surface to another surface by an adhesive compatible with the other surface.

In the article thus formed the flock fibers are partially embedded in the film of adhesive on the vinyl resin but have portions of their lengths projecting clear of the film in position to enter and be adhered by cement on the second surface. It is found that because of the range of distances at which adhesion may be secured between the vinyl resin surface and the second surface by reason of greater or less projection of the free fiber ends into the adhesive on the second surface, a superior bond between the vinyl resin material and the other material is obtained even when the surfaces joined are not perfectly plane. Because of this factor and because the fibers are not part of an integral sheet and do not have resistance to stretching or compression in directions parallel to the vinyl resin surface, sheet vinyl resin can be adhered even in sharp corners or to surfaces where the vinyl resin sheet must be stretched to coincide with the surface.

Also, because of this factor, particularly where intermediate portions of the flock fiber are not embedded in adhesive, there is a resilience and flexibility in the connection between the vinyl resin sheet, so that the vinyl resin sheet possesses a richer appearance and greater evenness than has been possible with heretofore known methods of applying vinyl resin sheet material.

In the accompanying drawing.

Figure 1:
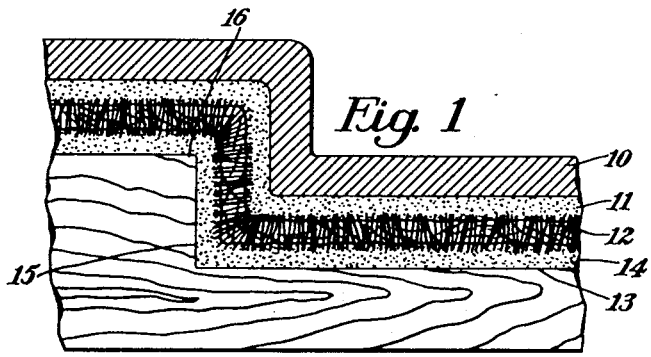
Fig. 1 is an enlarged cross-section of a sheet of vinyl resin adhered to a second surface in accordance with my invention.
Figure 2:
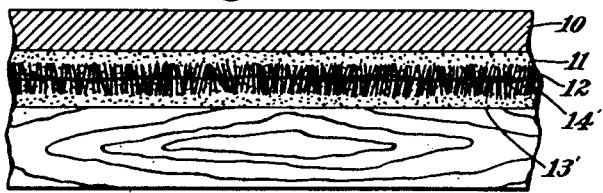
Fig. 2 is an enlarged cross-section of a sheet of vinyl resin adhered to a second surface in accordance with a modified form of my invention.
Figure 3:
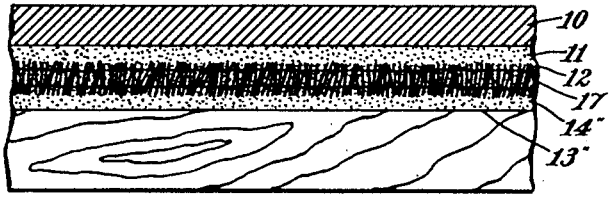
Fig. 3 is an enlarged cross-section of a sheet of vinyl resin adhered to a second surface in accordance with a further modification of my invention.

In Figs. 1, 2 and 3, certain parts are shown out of proportion for purposes of illustration.

The vinyl resin material adhered according to the present invention may comprise a sheet or other section of a vinyl resin, such as polyvinyl acetate, polyvinyl chloride, copolymerized vinyl acetate and vinyl chloride, polyvinyl acetal, or other suitable vinyl resin. Mixtures and copolymers of these and other vinyl resins are also contemplated. A preferred vinyl resin sheet comprises copolymerized vinyl acetate and vinyl chloride containing from about 80% to about 95% of vinyl chloride. Vinyl resin sheet material ordinarily contains a suitable plasticizer such as dibutyl phthalate or dibutyl sebacate.

In the embodiment shown in Fig. 1, a sheet 10 of vinyl resin comprising a copolymer of vinyl chloride and vinyl acetate containing about 95% vinyl chloride is spread, by means of known cement spreading apparatus, with a uniform film 11 of an adhesive capable of adhering strongly to the vinyl resin. Suitably the cement may be a solution of copolymerized butadiene and acrylonitrile in an organic solvent such as methyl ethyl ketone. A suitable copolymerized material is that disclosed in United States Patent to Garvey et al., No. 2,278,777 of April 7, 1942, which may comprise about 25 parts of acrylic nitrile and 75 parts of butadiene. The cement may also include other resinous material for improving the nature of the bond. The cement preferably has a viscosity of from about 20,000 to about 100,000 centipoises, and may be spread in a film, suitably from 0.006 to 0.018 inch, preferably 0.012 inch thick. Uniformity of the film is important to satisfactory adherence and suitably the film has a uniformity comparable with that which may be obtained by spreading the adhesive with apparatus comprising a doctor knife.

A layer of separate fibers 12, preferably rayon flock, cotton flock, or mixed rayon and cotton flock, is applied to the adhesive with portions of the fibers 12 embedded in and held by the adhesive to cover the surface of the sheet substantially uniformly. I have found that it is important to use flock of which the fibers are uniform in length. The length of the fibers should be such that free ends of the fibers project out from the adhesive film in a manner satisfactory for engaging a film of adhesive on a non-vinyl resin surface. The fibers may be from about 0.5 to about 2.0 mm. in length and preferably are from about 0.5 to about 1.5 mm. in length.

The surface 13 to be finished with the sheet 10 of vinyl resin is shown herein as a surface of a base material of wood, but the material may be leather or any other material. This surface 13 is coated with a layer 14 of adhesive capable of adhering to the surface. Adhesives which have been found suitable in practice are natural rubber latex, polymerized chloroprene latex, butadiene-acrylonitrile copolymer latex, and organic solvent cements comprising natural or synthetic rubbers such as those referred to. Casein glues and resin glues have also been found suitable. Other adhesives compatible with the surface to which the vinyl resin is adhered may be employed.

The flocked surface of the vinyl resin sheet 10 is then applied to the adhesive-coated surface and pressed to embed the fibers 12 at least partially into the layer 14 of adhesive on the surface 13. It is found that the vinyl resin sheet can be pressed into sharp corners, as at 15, or bent at sharp angles, as at 16, to coincide with irregularities in an adhesive-covered surface, and is held firmly by the adhesive within a very short period. It will be observed that the fibers 12 are spread apart adjacent the corner 15 and are closer together adjacent the angle 16 so that the vinyl resin sheet 10 is not compressed or stretched as it would be if a textile or other integral backing sheet were used.

The film of adhesive on the surface to which the vinyl resin is to be secured may be of any suitable thickness. However, in accordance with the modification of my invention shown in Fig. 1, a layer 14 of adhesive is applied to the surface 13 and the flock is only partially embedded in the adhesive layer 14 when the flocked surface of the vinyl resin sheet 10 is contacted therewith. This modification gives a. particularly desirable appearance and evenness due to the resilience of the non-embedded portions of the flock fibers, and also provides an improved flexibility in the surface sheet of vinyl resin which imparts increased resistance to shock or abrasion.

In a modification of my invention shown in Fig. 2, the flock fibers 12 of a vinyl resin sheet 10 are substantially completely embedded in the adhesive layers 11 and 14', there being substantially no free portions of said fibers. This modification secures the vinyl resin sheet 10 very strongly in place against forces tending to separate it from the surface 13.

According to a still further modification shown in Fig. 3, a layer 17 of adhesive, which may be the same as the adhesive of layer 14" on the surface to which the vinyl resin sheet 10 is to be secured, may be applied to the fibers 12 of the flocked surface of the sheet 10 of vinyl resin. The adhesive in layer 17 adheres to or coalesces with the adhesive of layer 14" on surface 13", and the bonds between the three layers 11, 17 and 14" are strengthened by the flock fibers 12. This modification gives a particularly strong bond between the vinyl resin sheet and the surface 13".

Although the invention has been described particularly in connection with the adhesion of a sheet of vinyl resin to a surface, it is to be understood that certain of the advantages may be secured in other relations, for example, thicker sections of vinyl resins may be secured to non-vinyl resin surfaces by applying to the vinyl resin section a layer of a suitable adhesive, coating the adhesive with flock of the disclosed characteristics, and adhesively securing the flocked surface of the vinyl resin section to the other surface. Also, it is to be understood that the fibered surface of the vinyl resin sheet or other section may be secured to vinyl resin and non-vinyl resin, e. g., wood, leather or other surfaces.

Other modifications will be apparent.

Having described my invention, what I claim as new and desire to secure by Letters Patent of the United States is:

1. A method of securing a flexible sheet of waterproof polymerized vinyl resin to a surface of a base material which comprises applying a film of adhesive to the surface of the vinyl resin sheet, securing short, separate cellulosic textile fibers of from about 0.5 to 2.0 mm. in length to the adhesive in upstanding relation to said sheet with portions of the lengths of said fibers projecting clear of the adhesive, and at least partially embedding the projecting portions of the fibers in a layer of adhesive on the surface of the base material, the film and layer of adhesive remaining substantially separate and said fibers serving as substantially the sole link holding the film and layer of adhesive in fixed relation.

2. A method of securing a flexible sheet of waterproof polymerized vinyl resin to a surface of a porous base material which comprises applying a film of adhesive to the surface of the vinyl resin sheet, securing short, separate cellulosic textile fibers from 0.5 to 2.0 mm. in length to the adhesive in upstanding relation to said sheet with portions of the lengths of said fibers projecting clear of the adhesive, applying a layer of a water base adhesive to the surface of the base material, pressing the filbered surface of the vinyl resin sheet toward said layer of adhesive on said base material to partially embed the projecting portions of said fibers in said layer of adhesive leaving the mid portions of said fibers free from both the film and the layer of adhesive, said film of adhesive remaining separate from said layer of adhesive, and the fibers serving as substantially the sole link holding the film and the layer of adhesive in fixed relation.

3. As an article of manufacture, a sheet of co-polymerized vinyl chloride and vinyl acetate comprising from about 80% to about 95% of vinyl chloride, a film of an adhesive on said sheet, said adhesive comprising copolymerized butadiene and acrylonitrile, the copolymer comprising substantially 25% by weight of acrylonitrile based on the weight of the butadiene, short separate fibers from the group consisting of rayon and cotton fibers of from about 0.5 to about 1.5 mm. in length adhered to said butadiene-acrylonitrile adhesive, but having portions of their lengths projecting clear of said film, a base and a layer of adhesive on said base, said projecting portions of the fibers being at least partially embedded in the layer of adhesive, the layer of adhesive on the base being substantially separate from the film of adhesive on the sheet and the fibers serving as substantially the sole link holding the layers of adhesive in fixed relation.

4. An article of manufacture comprising a flexible sheet of waterproof, polymerized vinyl resin, a film of adhesive on one surface of said sheet, short separate cellulosic textile fibers of from 0.5 to 2.0 mm. in length adhering to said film of adhesive in upstanding relation to said sheet with portions of the lengths of said fibers projecting clear of the adhesive, a base and a layer of adhesive on said base, said projecting portions of the fibers being only partially embedded in the layer of adhesive on the base surface with the mid portions of the fibers free from adhesive, the layer of adhesive being substantially separate from said film of adhesive and the fibers serving as substantially the sole link holding the film and layer of adhesive in fixed relation.

5. The method of securing a sheet of copolymerized vinyl chloride and vinyl acetate comprising from about 80 to 95% of vinyl chloride to a surface of a base material which comprises providing short, separate fibers from the group consisting of rayon and cotton fibers of from 0.5 to 1.5 mm. in length secured by a film of adhesive in upstanding relation to the surface of the sheet of resin with portions of the lengths of said fibers projecting clear of the adhesive on said sheet, and bonding the projecting portions of the fibers to the surface of the base material by means of a substantially separate layer of an adhesive compatible with said surface of the base material, the fibers serving as substantially the sole link holding the film and layer of adhesive in fixed relation, said film of adhesive comprising copolymerized butadiene and acrylonitrile, the copolymer comprising substantially 25% by weight of acrylonitrile based on the weight of the butadiene.

6. An article of manufacture comprising a flexible sheet of waterproof polymerized vinyl resin, a film of adhesive on one surface of said sheet, short separate fibers from the group consisting of rayon and cotton fibers of from about 0.5 to about 1.5 mm. in length, adhering to said film of adhesive in upstanding relation to said sheet with portions of the length of said fibers projecting clear of the adhesive, a base and a layer of adhesive on said base, said projecting portions of the fibers being at least partially embedded in the layer of adhesive on the base, the layer of adhesive being substantially separate from said film of adhesive and the fibers serving as substantially the sole link holding the film and layer of adhesive in fixed relation.

RUDOLPH F. WHITELEGG.

REFERENCES CITED

The following references are of record in the file of this patent:

UNITED STATES PATENTS

| Number | Name | Date |
|---|---|---|
| 2,176,837 | Ellis | Oct. 17, 1939 |
| 2,261,264 | Luty | Nov. 4, 1941 |
| 2,275,989 | Perry | Mar. 10, 1942 |
| 2,290,238 | Hickok | July 21, 1942 |
| 2,323,562 | Nugent | July 6, 1943 |
| 2,377,867 | D'Alelio | June 12, 1945 |
| 2,428,654 | Collins | Oct. 7, 1947 |